Patented Jan. 21, 1930

1,744,172

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

AZO DYESTUFF FROM 2-3-HYDROXYNAPHTHOIC ACID ARYLIDS AND PROCESS OF MAKING THE SAME

No Drawing. Application filed May 24, 1926, Serial No. 111,370, and in Germany May 28, 1925.

The present invention relates to new azo dyestuffs from 2-3-hydroxynaphthoic acid arylids and processes of making the same.

We have found that exceedingly valuable novel azo dyestuffs are obtained if 2-3-hydroxynaphthoic acid arylids are allowed to couple with the diazo compounds obtained from amines of the general type

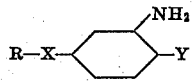

wherein Y represents a non-reactive substituent such as alkyl, oxyalkyl, oxyaryl or halogen; X represents either the sulfone group $SO_2$ or the carbonyl group CO and R represents alkyl, aryl, aralkyl or the grouping—

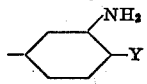

If bis-2-3-hydroxynaphthoyl-arylendiamines of the general formula

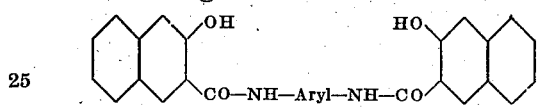

are used as coupling compounds, these will react either with 2 molecular proportions of a monoamine of the type

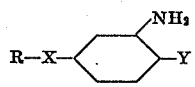

wherein Y represents a non-reactive substituent such as alkyl, oxyalkyl, oxyaryl or halogen; X represents either the sulfone group $SO_2$ or the carbonyl group CO and R represents alkyl, aryl or aralkyl, or probably with one molecular proportion only of a diamine of the type:

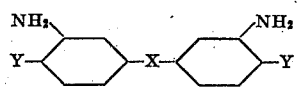

in which formula the letters X and Y have the same meaning as defined above.

The most probable graphical representation for our novel dyestuffs is the formula

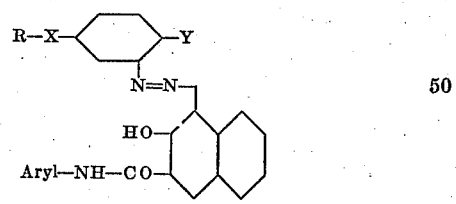

wherein Y stands for a non-reactive substituent such as alkyl, oxyalkyl, oxyaryl, halogen: X represents either the sulfone group $SO_2$ or the carbonyl group CO and R represents either alkyl, aryl, aralkyl or the grouping:

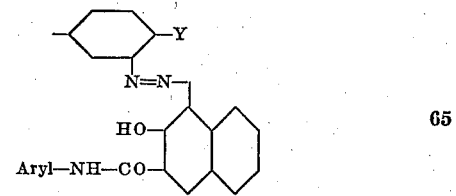

These coloring matters are in the dry state reddish to dark colored powders, which dissolve in concentrated sulfuric acid with from blue to dark violet colors. By reduction the original amines of the type

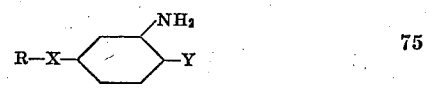

are recovered together with 1-amino-2-3-hydroxynaphthoic acid arylids. The new dyestuffs may be produced either as such or on a base which may be either a substratum or the vegetable fibre.

Mixed with or precipitated on substrata these novel dyestuffs produce valuable and fast color lakes. They are furthermore of great interest in the dyeing of vegetable fibres. The dyestuff is in this case directly produced on the fibre, the dyeings obtained are of exceedingly clear shades and particularly fast to kier boiling.

Some of the amines which can be used in our novel process are for instance the following:

2-aminotolyl-4-phenylsulfone:

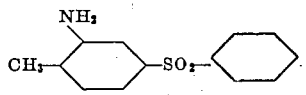

3-amino-4-phenoxybenzophenone:

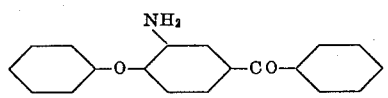

3-3'-diamino-4-4'-dimethoxy-diphenylsulfone:

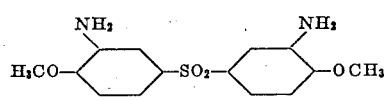

2-aminotolyl-4-benzylsulfone:

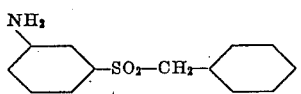

2-amino-1-methoxy-4-phenylsulfone:

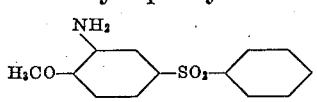

and the 2-3-hydroxynaphthoic acid arylids useful in our novel process can be exemplified by the following:

2-3-hydroxynaphthoyl-1-2-phenetidine:

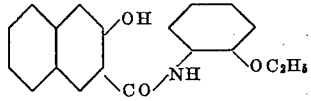

2-3-hydroxynaphthoic acid-beta-naphthalid:

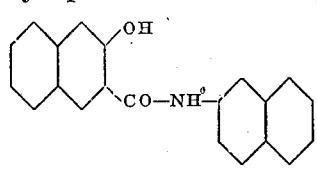

2-3-hydroxynaphthoic acid-alpha-naphthalid:

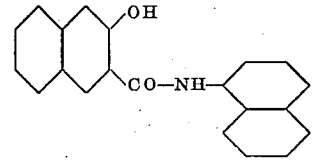

2-3-hydroxynaphthoic acid-m-chloranilid:

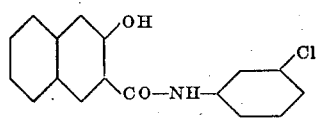

The following examples will further illustrate our novel process and the products obtained by it. We wish it however to be understood that we are not limited to the particular conditions nor to the specific products mentioned therein. The parts are by weight.

Example 1: 8.3 parts 2-amino-1-methoxy-4-phenylsulfone are thoroughly stirred up with 16 parts hydrochloric acid (spec. grav. 1.160) 50 parts water and ice added, and then diazotized with a solution of 2.1 parts sodium nitrite in 15 parts water. To this diazo a filtered solution of 9.2 parts 2-3-hydroxynaphthoyl-1-2-phenetidine in 8.4 parts caustic soda (36° Bé.), 1 part Turkey-red oil; 3.67 parts crystal sodium acetate in 150 parts water is run in. The coupling is finished after several hours stirring. The dyestuff is so obtained in form of a brilliant red paste, mixed with the usual substrates it forms a fiery red lake. After drying it dissolves in concentrated sulfuric acid with a bluish-violet color and has most probably the formula:

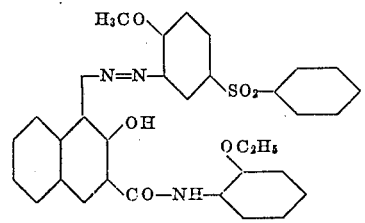

Example 2: Well boiled out and dried yarn is padded with a solution containing per liter 3 gr. 2-3-hydroxynaphthoic acid-beta-naphthalid, 9 cc. caustic soda 34° Bé. and 8 cc. Turkey-red oil, it is then well wrung and without drying developed with a solution containing per liter the diazo obtained from 4.9 gr. 2-amino-tolyl-4-phenylsulfone and which was neutralized with calcium carbonate. After rinsing, soaping and drying the yarn is dyed a bluish-red shade of very good fastness to kier boiling. The dyestuff precipitated on the fibre has most probably the formula:

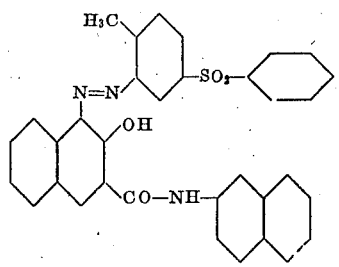

Example 3: Well boiled out and dried yarn is padded with a solution containing per liter 7 gr. 2-3-hydroxynaphthoic acid-alpha-naphthalid, 14 cc. caustic soda 34° Bé. and 8 cc. Turkey-red oil, it is then well wrung and without drying developed with a solution containing per liter the diazo obtained from 4.9 gr. 2-amino-tolyl-4-phenylsulfone and which was neutralized with calcium carbonate. After rinsing, soaping and drying the yarn is dyed a bluish-red shade of very good fastness to kier boiling.

The dyestuff precipitated on the fibre has most probably the formula:

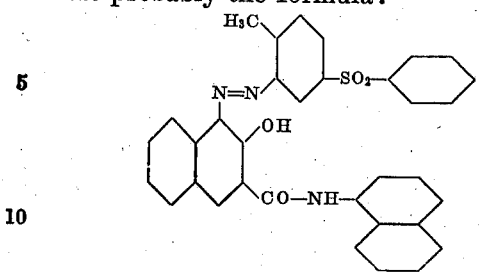

If in this example the diazo from 5.8 gr. 3-amino-4-phenoxybenzophenone is substituted for the diazo from 2-amino-tolyl-4-phenylsulfone a very fast wine red shade on cotton yarn is obtained.

Example 4: Cotton material prepared in the usual way is padded with a solution containing per liter 10 gr. 2-3-hydroxynaphthoic acid-m-chloranilid, 15 cc. caustic soda 34° Bé. and 8 cc. Turkey-red oil, it is then well wrung and without drying developed with a solution containing per liter the diazo compound obtained from 6.2 gr. 3-3'-diamino-4-4'-dimethoxy-diphenylsulfone which has been made organic acid by the addition of sodium acetate. After rinsing, soaping and drying the cotton is dyed a claret shade of very good fastness to kier boiling. The dyestuff precipitated on the fibre has most probably the formula:

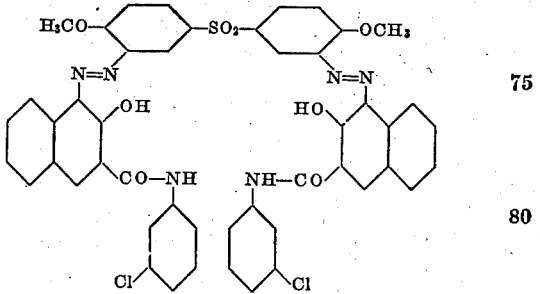

The same shades and fastness properties are obtained by producing the dyestuffs on the fibre by the usual printing processes.

The following table gives the shades obtained on cotton material by using other of our novel azo combinations:

| Diazocompound of— | Combined with 2.3-hydroxynaphthoyl— | Shades |
|---|---|---|
| 2-amino-tolyl-4-ethyl-sulfone of the formula:<br>CH₃—⬡(NH₂)—SO₂—C₂H₅ | 5-chloro-2-anisidine of the formula:<br>⬡⬡(OH)(CO—NH—⬡(OCH₃)(Cl)) | Fiery yellowish red |
| 2-amino-tolyl-4-benzyl-sulfone of the formula:<br>CH₃—⬡(NH₂)—SO₂—CH₂—⬡ | Aniline | Yellowish scarlet red |
| Do. | 5-chloro-2-toluidine | Bluish red |
| Do. | 3-nitraniline | Scarlet |
| Do. | β-naphthylamine | Clear scarlet red |
| 3-amino-4-chloro-diphenylsulfone of the formula:<br>Cl—⬡(NH₂)—SO₂—⬡ | β-naphthylamine | Red |
| Do. | 3-nitraniline | Yellowish red |
| Do. | 3-toluidine | Orange red |
| Do. | 2-phenetidine | Orange red |
| 2-amino-phenetol-4-phenylsulfone of the formula:<br>C₂H₅O—⬡(NH₂)—SO₂—⬡ | 5-chloro-2-toluidine | Bluish red |
| Do. | 2-anisidine | Wine red |
| Do. | 5-chloro-2-anisidine | Scarlet red |
| Do. | 2-phenetidine | Clear red |
| 2-amino-tolyl-4-phenylsulfone of the formula:<br>CH₃—⬡(NH₂)—SO₂—⬡ | 4-toluidine | Fiery yellowish red |
| Do. | 2-anisidine | Fiery scarlet Red |
| Do. | 4-chloro-2-anisidine | |
| Do.<br>(Two molecular proportions) | Bis-2.3-hydroxynaphthoyl-dianisidine of the formula:<br>⬡⬡(OH)(CO—NH—⬡(OCH₃))—⬡(OCH₃)(NH—OC)⬡⬡(HO) | Brown like garnet |

| Diazocompound of— | Combined with 2.3-hydroxynaphthoyl— | | Shades |
|---|---|---|---|
| 3-amino-4-methoxy-aceto-phenone of the formula:  | 2.3-hydroxynaphthoyl— | | |
| | 5-chloro-2-toluidine | | Claret red |
| 3-amino-4-methoxy-benzo-phenone of the formula: 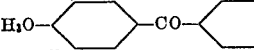 | 4-hloroaniline | | Claret red |
| | 5-choloro-2-anisidine | | Claret red |
| 3-amino-4-phenoxy-benzo-phenone of the formula: 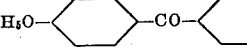 | β-naphthylamine | | Claret red |
| 3.3'-diamino-4.4'-ditolylketone of the formula: 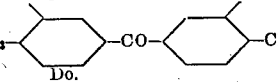 | (Two molecular proportions) | | |
| | Aniline | | Fiery scarlet |
| Do. | β-naphthylamine | | Fiery scarlet |
| Do. | 4-toluidine | | Fiery scarlet |
| Do. | 4-chloroaniline | | Clear scarlet red |
| Do. | 3-phenetidine | | Clear scarlet red |

We claim:

1. In processes of producing azo dyestuffs from 2-3-hydroxy-naphthoic acid arylids the steps comprising diazotizing an amine of the general type:

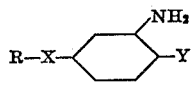

wherein Y represents alkyl, oxyalkyl, oxyaryl or halogen; X represents either the sulfone group $SO_2$ or the carbonyl group CO, and R represents alkyl, aryl, aralkyl or the grouping:

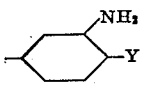

and coupling the diazotized compound so obtained with a 2-3-hydroxynaphthoic acid arylid.

2. As new products azo dyestuffs having most probably the general formula:

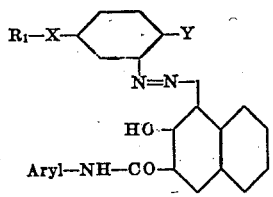

wherein Y stands for alkyl, oxyalkyl, oxyaryl or halogen; X represents either the sulfone group $SO_2$ or the carbonyl group CO, and $R_1$ represents either alkyl, aryl, aralkyl or the grouping:

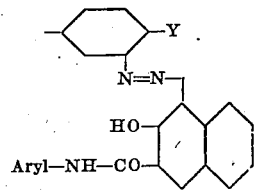

which are in the dry state reddish to dark colored powders, soluble in concentrated sulfuric acid with from blue to dark violet colors, and which by reduction yield an amine of the type:

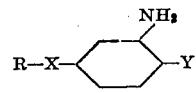

in which X and Y, have the same significance as above and R represents either alkyl, aryl, aralkyl or the grouping:

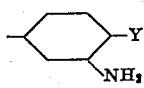

and a 1-amino-2-3-hydroxynaphthoic acid arylid, and which when produced on vegetable fibres yield reddish-shades of excellent fastness to kier boiling.

3. Vegetable fibres dyed with the dyestuffs described in claim 2.

4. In processes of producing azo dyestuffs from 2-3-hydroxynaphthoic acid arylids the steps comprising diazotizing an amine of the general type:

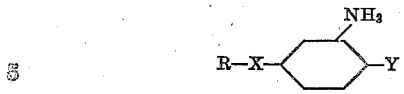

wherein Y stands for alkyl, oxyalkyl, oxyaryl, or halogen; X represents either the sulfone group $SO_2$ or the carbonyl group CO, and R represents alkyl, aryl or aralkyl, and coupling the diazo compound obtained with a 2-3-hydroxynaphthoic acid arylid.

5. As new products azo dyestuffs having most probably the general formula:

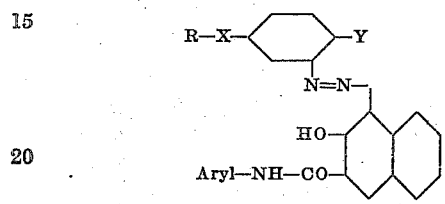

wherein Y represents alkyl, oxyalkyl, oxyaryl or halogen; X represents either the sulfone group $SO_2$ or the carbonyl group CO, and R represents alkyl, aryl or aralkyl, which are in the dry state reddish to dark colored powders soluble in concentrated sulfuric acid with from blue to dark violet colors and which by reduction yield an amine of the type:

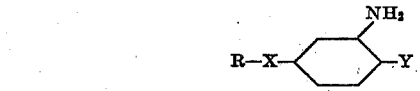

in which X, R and Y have the same significance as above and a 1-amino-2-3-hydroxynaphthoic acid arylid, and which when produced on vegetable fibres yield reddish shades of excellent fastness to kier boiling.

6. Vegetable fibres dyed with the dyestuffs described in claim 5.

7. In processes of producing azo dyestuffs from 2-3-hydroxynaphthoic acid arylids the steps comprising diazotizing an amine of the general type:

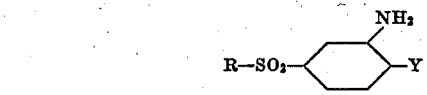

wherein Y stands for alkyl, oxyalkyl, oxyaryl, or halogen, and R represents alkyl, aryl, or aralkyl, and coupling the diazocompound obtained with a 2-3-hydroxynaphthoic acid arylid.

8. As new products, azo dyestuffs having most probably the general formula:

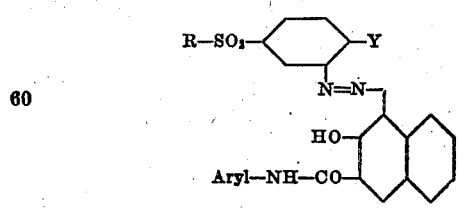

wherein Y stands for alkyl, oxyalkyl, oxyaryl, or halogen and R represents alkyl, aryl or aralkyl, which dyestuffs are in the dry state reddish to dark colored powders soluble in concentrated sulfuric acid with from blue to dark violet colors and which by reduction yield an amine of the type:

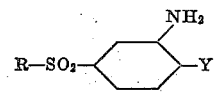

wherein Y and R have the same significance as above and a 1-amino-2-3-hydroxynaphthoic acid arylid, and which when produced on vegetable fibres yield reddish shades of excellent fastness to kier boiling.

9. Vegetable fibres dyed with the dyestuffs described in claim 8.

In testimony whereof we have hereunto set our hands.

LEOPOLD LASKA.
ARTHUR ZITSCHER.